(12) United States Patent
Schneider et al.

(10) Patent No.: US 6,271,645 B1
(45) Date of Patent: Aug. 7, 2001

(54) METHOD FOR BALANCING BATTERY PACK ENERGY LEVELS

(75) Inventors: Eric Duane Schneider, Carmel; Gerald Thomas Fattic, Fishers, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/502,752

(22) Filed: Feb. 11, 2000

(51) Int. Cl.⁷ .................................................. H02J 7/00
(52) U.S. Cl. ............................................. 320/118; 320/119
(58) Field of Search ..................................... 320/116, 119, 320/125, 162, 155

(56) References Cited

U.S. PATENT DOCUMENTS

| | | | |
|---|---|---|---|
| 4,502,001 | 2/1985 | Galloway | 320/122 |
| 5,631,534 | 5/1997 | Lewis | 320/103 |
| 5,652,502 | * 7/1997 | Van Phuoc et al. | 320/134 |
| 5,656,919 | * 8/1997 | Proctor et al. | 320/153 |
| 5,751,150 | 5/1998 | Rippel et al. | 324/537 |
| 5,757,163 | * 5/1998 | Brotto et al. | 320/155 |
| 5,764,027 | 6/1998 | Harvey | 320/125 |
| 5,818,201 | * 10/1998 | Stockstad et al. | 320/119 |
| 5,900,716 | 5/1999 | Collar et al. | 320/118 |
| 5,905,360 | * 5/1999 | Ukita | 320/121 |
| 5,920,179 | 7/1999 | Pedicini | 320/122 |
| 5,952,815 | * 9/1999 | Proctor et al. | 320/153 |

* cited by examiner

*Primary Examiner*—Peter S. Wong
*Assistant Examiner*—Qa Tibbits
(74) *Attorney, Agent, or Firm*—Margaret A. Dobrowitsky

(57) ABSTRACT

A method and circuit for balancing energy levels among first and second battery groups within a battery pack are provided. The first and second battery groups are connected across a first current bus that may, for example, provide power for an electric motor of an electric vehicle. The first battery group is also connected across a second current bus that may, for example, provide current to vehicle electrical systems such as lighting systems. The method includes the steps of generating a first state of charge value indicative of a first energy level in the first battery group and generating a second state of charge value indicative of a second energy level in the second battery group. The method also includes the step of controlling the first energy level responsive to the first and second state of charge values.

17 Claims, 4 Drawing Sheets

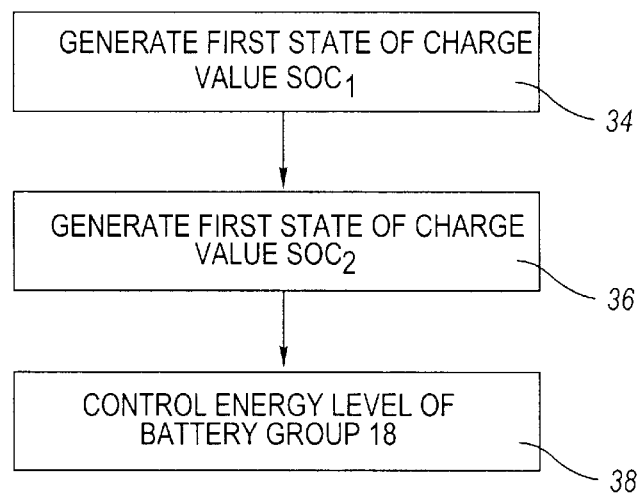
*Fig. 2*
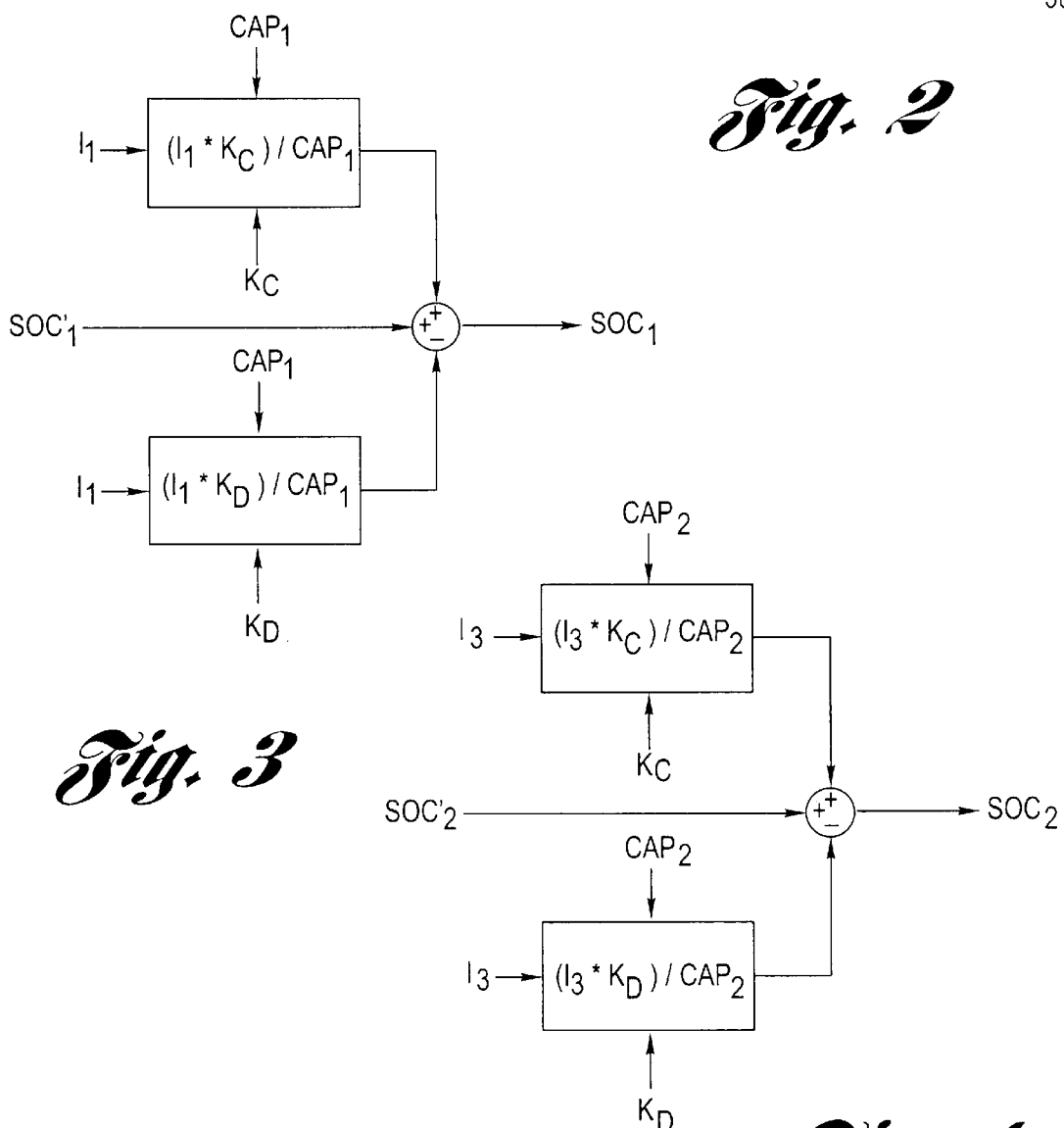
*Fig. 3*
*Fig. 4*

METHOD FOR BALANCING BATTERY PACK ENERGY LEVELS

BACKGROUND OF THE INVENTION

1. Field of the Invention

This invention relates to a method and a circuit for balancing energy levels among batteries in a battery pack.

2. Disclosure of Related Art

As shown in U.S. Pat. No. 5,631,534, a conventional system for powering an electric or hybrid vehicle may include a battery pack having a plurality of batteries connected in series across a first current bus. The first current bus may be used to provide power to an electric motor in the vehicle. The power provided across the first current bus is limited by the energy level of the weakest battery in the group of series connected batteries. Accordingly, also as shown in U.S. Pat. No. 5,631,534, it is conventional to provide a circuit for balancing the energy levels among the series connected batteries. It is also conventional for the battery pack to include an additional battery coupled across a second, accessory current bus that provides power for lighting, starting, and other electrical systems in the vehicle. The use of an additional battery to power vehicle electrical systems increases the cost and size of the battery pack and vehicle, however.

There is thus a need for a method and circuit for balancing energy levels in a battery pack that will minimize or eliminate one or more of the above-mentioned deficiencies.

SUMMARY OF THE INVENTION

The present invention provides a method and a circuit for balancing energy levels among batteries in a battery pack. In particular, the present invention provides a method and circuit for balancing energy levels between a first battery group and a second battery group in a battery pack wherein the first and second battery groups are connected across a first current bus and the first battery group is further connected across a second current bus. The first current bus may be used, for example, to provide power to an electric motor in a vehicle while the second current bus may be used, for example, to power vehicular electrical systems including lighting, and other systems. The starting function may be performed by the electrical machine on the first current bus (i.e., the higher voltage bus).

A method in accordance with the present invention may include the step of generating a first state of charge value indicative of a first energy level of the first battery group. The method may also include the step of generating a second state of charge value indicative of a second energy level of the second battery group. Finally, the method may include the step of controlling the first energy level responsive to the first state of charge value and the second state of charge value.

A circuit in accordance with the present invention may include means, such as current sensors and a controller operating under the control of software, for generating first and second state of charge values indicative of a first energy level of the first battery group and a second energy level of the second battery group, respectively. The circuit may also include means, such as the above-identified controller and a converter, for controlling the first energy level in said first battery group responsive to the first and second state of charge values.

One advantage of a method and circuit in accordance with the present invention is that the inventive method and circuit are able to maintain a balance in energy levels among batteries within a battery pack wherein the pack is used to provide power to two current buses having different loads. The inventive method and circuit therefore eliminate the need for a separate, additional battery to provide power to the second current bus.

These and other advantages of this invention will become apparent to one skilled in the art from the following detailed description and the accompanying drawings illustrating features of this invention by way of example.

BRIEF DESCRIPTION OF THE DRAWINGS

FIG. 2 is a flowchart diagram illustrating a method in accordance with the present invention.

FIG. 3 is a diagrammatic representation of the step of generating a first state of charge value in the method illustrated in FIG. 2.

FIG. 4 is a diagrammatic representation of the step of generating a second state of charge value in the method illustrated in FIG. 2.

DETAILED DESCRIPTION OF THE PREFERRED EMBODIMENT

Figure 1:
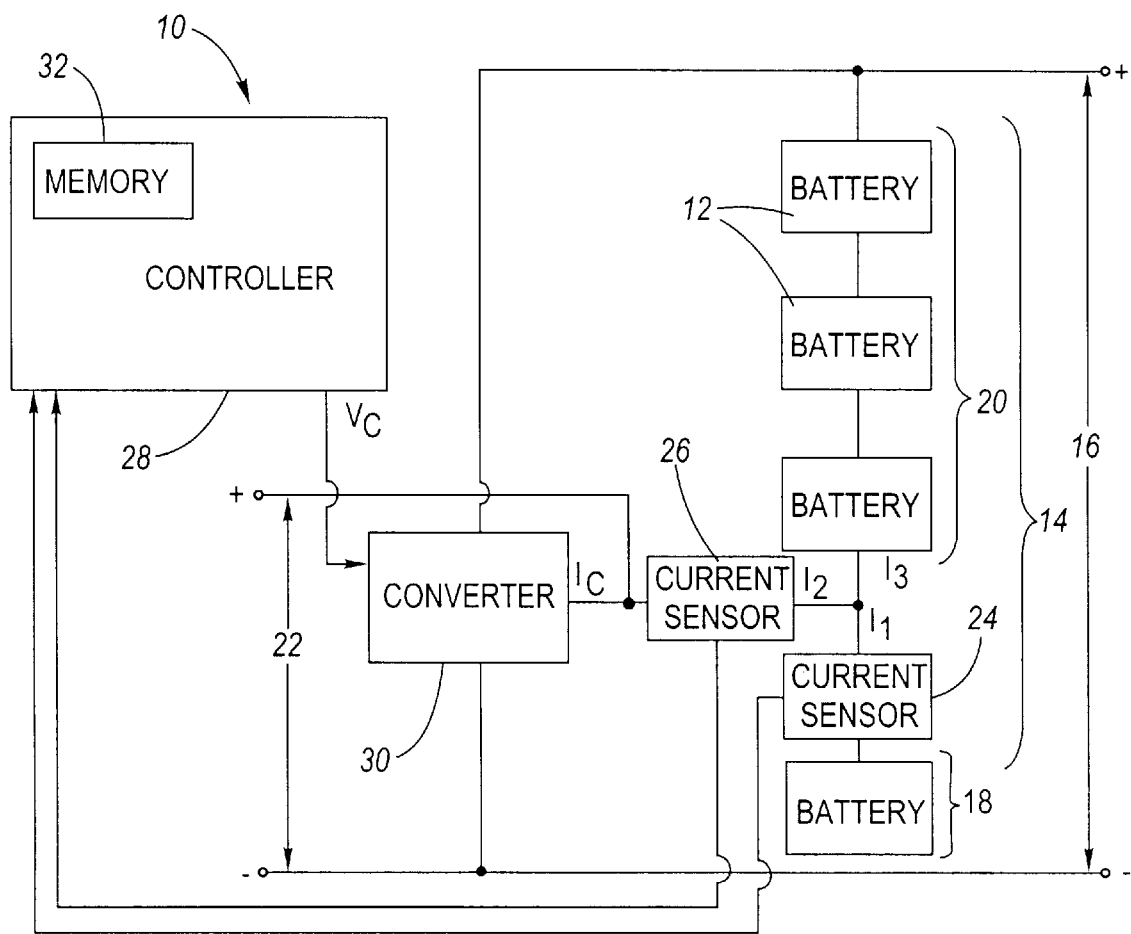
FIG. 1 is a schematic and block diagram illustrating a circuit in accordance with the present invention.

Referring now to the drawings wherein like reference numerals are used to identify identical components in the various views, FIG. 1 illustrates a circuit 10 for balancing energy levels among batteries 12 within a battery pack 14 in accordance with the present invention. Pack 14 may provide power for an electric or hybrid vehicle. It should be understood, however, that pack 14 may be used in a wide variety of applications. Pack 14 may include four batteries 12 connected in series across a first current bus 16. Bus 16 may be used, for example, to provide power to an electric motor of a vehicle. Pack 14 may include first and second battery groups 18, 20 and group 18 may also be connected across a second current bus 22. Bus 22 may be used, for example, to provide power to various vehicular electrical systems (i.e., accessory loads) including fans, lighting, and other systems. It should be understood that the number of batteries 12 within pack 14 and within groups 18, 20 may vary in response to the requirements of the intended application. Batteries 12 may comprise conventional twelve (12) volt lead-acid batteries, thereby providing about forty-eight (48) volts across bus 16 and about twelve (12) volts across bus 22. It should be understood, however, that the voltage level and type of battery may vary. For example, batteries 12 may alternatively comprise any of a wide variety of conventional batteries including nickel-cadmium batteries, nickel-metal-hydride batteries and lithium-polymer batteries.

As mentioned above, circuit 10 is provided to balance the energy levels among batteries 12 within pack 14. In particular, circuit 10 may be provided to balance the energy level of battery group 18 relative to battery group 20. Circuit 10 may include means, such as current sensors 24, 26 and a controller 28 operating under the control of software, for generating first and second state of charge values indicative of the energy levels, or states of charge, of battery groups 18, 20, respectively. Circuit 10 may also include means, such as controller 28 operating under the control of software and a converter 30, for controlling the energy level of battery group 18 responsive to the first and second state of charge values.

Current sensors 24, 26 are provided to measure current levels within battery pack 14 and to generate current indicative signals indicative of the measured current level. Sensors 24, 26 may comprise conventional apparatus known in the art. In a constructed embodiment, sensors 24, 26 comprise shunts (i.e., calibrated resistors that produce a given voltage for a given amount of current). Alternative configurations for sensors 24, 26 may include Hall Effect Sensors. Sensor 24 is configured to measure the level of a current $I_1$ in battery group 18 and to generate a current indicative signal indicative of the level of current $I_1$. Sensor 26 is configured to measure the level of a current $I_2$ provided by battery group 18 to current bus 22 and to generate a current indicative signal indicative of the level of current $I_2$.

Controller 28 is provided to manage and control pack 14. Controller 28 is also provided to control converter 30 responsive to the current levels of currents $I_1$ and $I_2$ as measured by sensors 24, 26. Controller 28 may include a memory 32 and operates under the control of software which may be stored in memory 32 or another memory (not shown) external to controller 28. The software may configure controller 28 to perform the steps of generating first and second state of charge values corresponding to the energy levels of battery groups 18, 20 and controlling the energy level of group 18 responsive to the first and second state of charge values, as well as the substeps associated with these steps, as described in greater detail hereinbelow.

Converter 30 is provided to control the energy level, or state of charge, of pack 14 and battery group 18. Converter 30 is conventional in the art and may comprise a direct current to direct current (DC/DC) converter 30. Converter 30 may be connected across current bus 16 and current bus 22. The operating voltage of converter 30 may be controlled responsive to a voltage command $V_C$ from controller 28 and converter 30 may provide a current $I_C$ to battery group 18 responsive thereto.

Referring now to FIG. 2, a method for balancing energy levels in battery pack 14 in accordance with the present invention will be described. A method in accordance with the present invention may include the steps 34, 36, 38 of: (i) generating a first state of charge value $SOC_1$ indicative of the energy level, or state of charge, of battery group 18; (ii) generating a second state of charge value $SOC_2$ indicative of the energy level, or state of charge, of battery group 20; and (iii) controlling the energy level of battery group 18 responsive to the first and second state of charge values $SOC_1$ and $SOC_2$.

The step 34 of generating a first state of charge value $SOC_1$ may include several substeps. In particular, step 34 may include the substeps of sensing the level of a current $I_1$ in battery group 18 and determining the first state of charge value $SOC_1$ responsive to the measured current level. Current sensor 24 may be used to measure the level of current $I_1$ and generate a current indicative signal indicative of the level of current $I_1$. Referring to FIG. 3, controller 28 may then be used to determine the first state of charge value $SOC_1$ according to the following formula:

$$SOC_1 = SOC_1' + ((I_1 * K_C)/CAP_1) - ((I_1 * K_D)/CAP_1)$$

The coefficients $K_C$ and $K_D$ are designed to compensate for coulombic efficiency in charging and discharging battery group 18. In one embodiment of the invention, the coulombic efficiencies for charging and discharging battery group 18 are assumed to be 96% and 100%. Therefore, coefficients $K_C$ and $K_D$ are 0.96 and 1.0, respectively. $CAP_1$ represents a predetermined battery group capacity value for battery group 18 and is estimated based on the magnitude of the capacity of group 18 assuming group 18 had new batteries 12. $SOC_1'$ represents a previously measured state of charge value for battery group 18. In one embodiment of the invention, the first state of charge value is determined every 7.8 milliseconds.

The step 36 of generating a second state of charge value $SOC_2$ may also include several substeps. In particular, step 36 may include the substeps of sensing the level of a current $I_3$ in battery group 20 and determining the second state of charge value $SOC_2$ responsive to the measured current level. Current sensors 24 and 26 may be used to measure the level of currents $I_1$ and $I_2$ and to generate current indicative signals indicative of the levels of currents $I_1$ and $I_2$. The level of current $I_3$ may then be determined by controller 28 by subtracting the level of current $I_2$ from the level of current $I_1$. Referring to FIG. 4, controller 28 may then be used to determine the second state of charge value $SOC_2$ according to the following formula:

$$SOC_2 = SOC_2' + ((I_2 * K_C)/CAP_2) - ((I_2 * K_D)/CAP_2)$$

As set forth hereinabove, $K_C$ and $K_D$ are coefficients designed to compensate for coulombic efficiency in charging and discharging battery group 18 and may be 0.96 and 1.0, respectively, in one embodiment of the present invention. These coefficients, however, may vary based upon the type of battery used or the amount of current provided to the batteries. $CAP_2$ represents a predetermined battery group capacity value for battery group 20 and is estimated based on the magnitude of the capacity of group 20 assuming group 20 had new batteries 12. $SOC_2'$ represents a previously measured state of charge value for battery group 20. In one embodiment of the invention, the second state of charge value is determined every 7.8 milliseconds.

Figure 5:
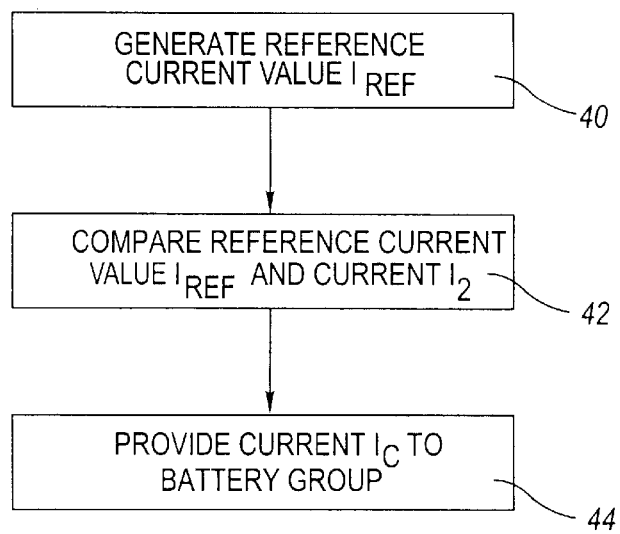
FIG. 5 is a flowchart diagram illustrating substeps in the step of controlling the energy level of a battery group in the method illustrated in FIG. 2.

The step 38 of controlling the energy level of battery group 18 responsive to state of charge values $SOC_1$ and $SOC_2$ may include the substep of charging battery group 18 in order to balance the energy levels of battery groups 18, 20. Referring to FIG. 5, the substep of charging battery group 18 will be described in greater detail. The charging substep may include the substeps 40, 42, 44 of: (i) generating a reference current value $I_{REF}$ responsive to the state of charge values $SOC_1$ and $SOC_2$; (ii) comparing the reference current value $I_{REF}$ to the level of current $I_2$ to obtain a current error value $I_{ERROR}$; and (iii) providing a current $I_C$ to battery group 18 responsive to the current error value $I_{ERROR}$.

The substep 40 of generating a reference current value $I_{REF}$ may further include several substeps. In particular, substep 40 may first include the substep of comparing the state of charge values $SOC_1$ and $SOC_2$ to obtain a state of charge difference value $SOC\Delta$. Controller 28 may perform this substep by subtracting the state of charge value $SOC_1$ from the state of charge value $SOC_2$. Substep 40 may also include the substep of accessing a look-up table in a memory, such as memory 32, using the state of charge difference value SOCΔ to obtain reference current value $I_{REF}$. Reference current value $I_{REF}$ comprises the desired current level of current $I_2$ to ensure balanced energy levels among battery groups 18, 20.

Figure 6:
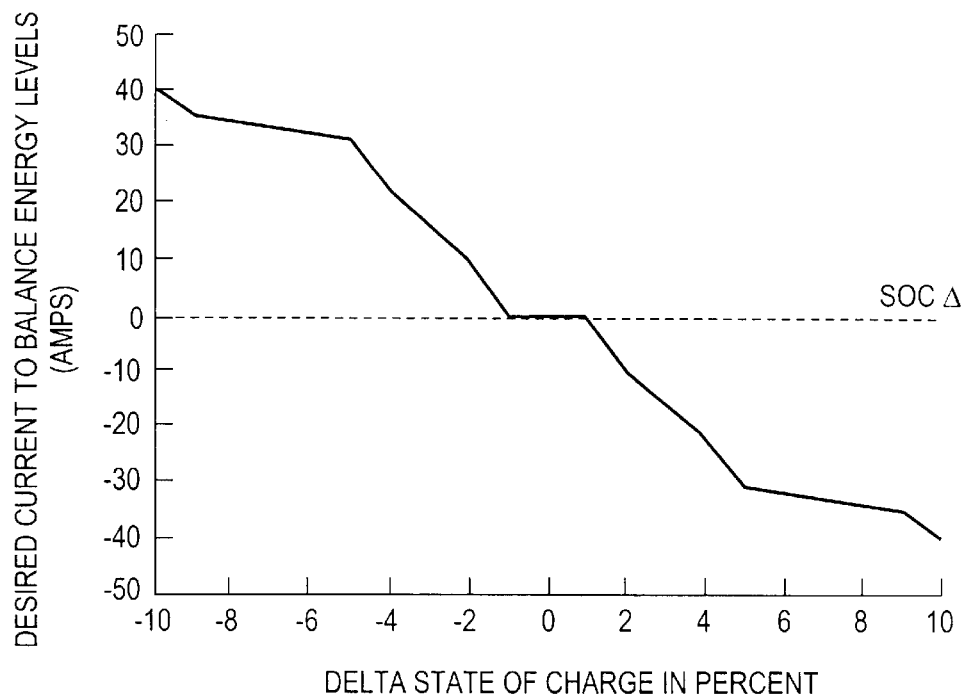
FIG. 6 is a graph illustrating current values for charging or discharging a battery group within a battery pack responsive to a difference in energy levels among battery groups within the battery pack.

Referring to FIG. 6, if state of charge difference value SOCΔ indicates that the difference in the energy levels, or states of charge, among battery groups 18, 20 is less than one percent, reference current value $I_{REF}$ may be zero. If the state of charge difference value SOCΔ indicates that the energy level of battery group 20 is greater than the energy level of battery group 18 by more than one percent, then a charging or negative reference current value $I_{REF}$ will be generated. If the state of charge difference value SOCΔ indicates that the energy level of battery group 20 is less than the energy level of battery group 18 by more than one percent, then a discharging or positive reference current value $I_{REF}$ will be generated. In the illustrated embodiment, reference current value $I_{REF}$ assumes the value for a ten percent difference in energy levels when state of charge difference value SOCΔ indicates that the difference in energy levels is greater than ten percent. It should be understood that the reference current values in FIG. 6 are illustrative and that actual values may vary relative to certain design considerations associated with pack 14, groups 18, 20 and batteries 12.

The substep 42 of comparing reference current value $I_{REF}$ to the level of current $I_2$ may be performed by controller 28. The comparison may be accomplished by subtracting the measured level of current $I_2$ from the reference current value $I_{REF}$ to obtain the current error value $I_{ERROR}$.

The substep 44 of providing a current $I_C$ to battery group 18 may also include several substeps including the substep of controlling converter 30 responsive to current error value $I_{ERROR}$.

Figure 7:
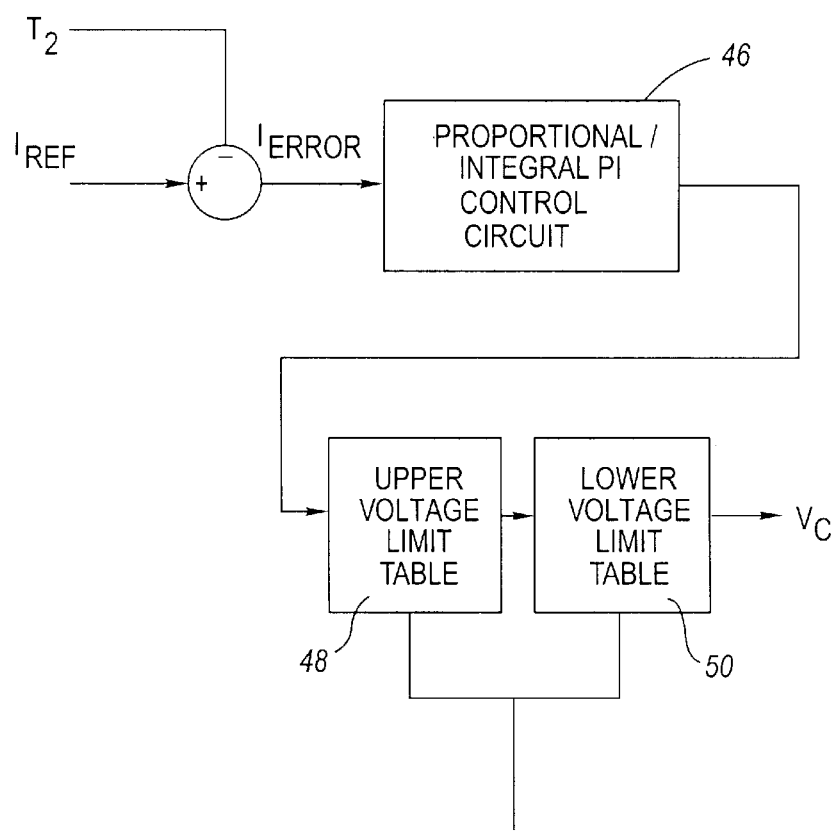
FIG. 7 is a diagrammatic representation of the substeps of FIG. 5.

Referring to FIG. 7, the substep of controlling converter 30 may also include several substeps. First, the substep of controlling converter 30 may include the substep of processing current error value $I_{ERROR}$ using a proportional/integral control circuit 46. Circuit 46 may form part of controller 28 and is provided to control converter 30 to gradually adjust current $I_C$ and the energy level of battery group 18. Circuit 46 is conventional in the art and generates a voltage command $V_C$ to control converter 30 responsive to current error value $I_{ERROR}$. Second, the substep of controlling converter 30 may include the substep of controlling an operating voltage of converter 30 within predetermined upper and lower voltage limits. The upper and lower voltage limits are designed to limit the operating voltage of converter 30 to prevent large variations in voltage on current bus 22. The substep of controlling the operating voltage of converter 30 within predetermined voltage limits may further include the substeps of (i) determining the upper and lower voltage limits responsive to a battery temperature BAT_TEMP associated with battery group 18; (ii) comparing the voltage command $V_C$ to the predetermined upper and lower voltage limits; and (iii) adjusting voltage command $V_C$ if voltage command $V_C$ is outside of the range defined by the predetermined upper and lower voltage limits. The upper and lower voltage limits may be stored in look up tables 48, 50 stored in a memory, such as memory 32. Tables 48, 50 may be accessed responsive to a battery temperature signal BAT_TEMP generated by a conventional temperature sensor (not shown) in battery group 18.

Figure 8:
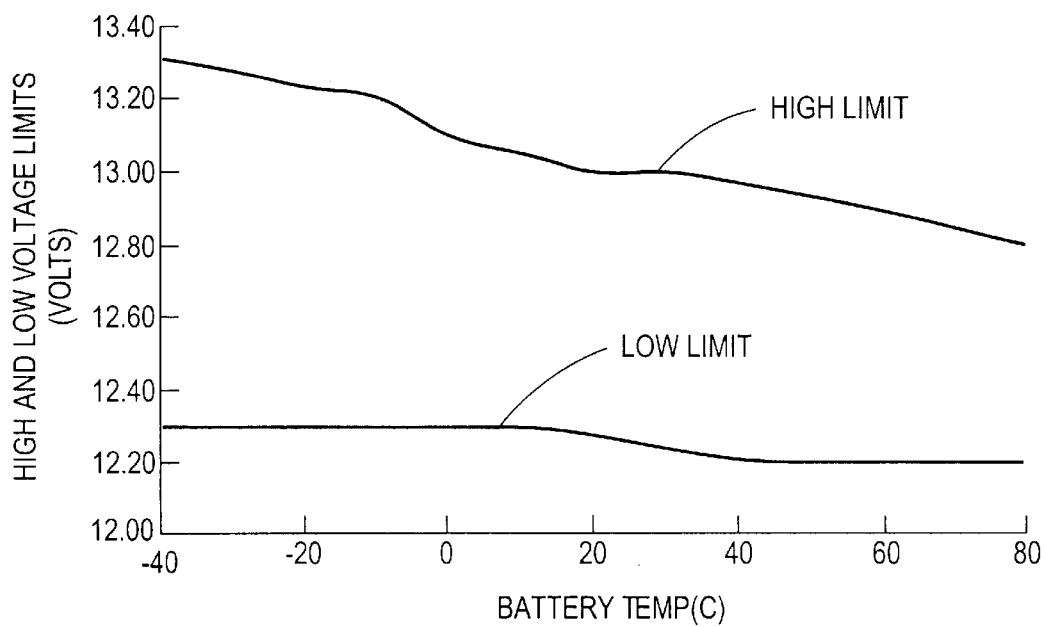
FIG. 8 is a graph illustrating upper and lower limits for the operating voltage of the converter of the circuit of FIG. 1 relative to the temperature of one of the battery groups of FIG. 1.

FIG. 8 illustrates an exemplary set of voltage limits based on battery temperature within group 18. It should be understood, however, that the voltage limits set forth in FIG. 8 are exemplary only and will vary depending upon design considerations of pack 14, battery groups 18, 20, batteries 12, and the intended application for pack 14. Substep 44 may finally include the substep of controlling converter 30 responsive to voltage command $V_C$ (as determined in response to the previously determined current error value $I_{ERROR}$ as described hereinabove). Referring to FIG. 1, converter 30 will generate a current $I_C$ responsive to voltage command $V_C$ to charge or discharge battery group 18 thereby controlling the energy level of group 18 and balancing the energy level of group 18 with respect to group 20.

A method and circuit in accordance with the present invention are advantageous because the inventive method and circuit are able to maintain a balance in energy levels among batteries 12 within a battery pack 14 wherein the pack 14 is used to provide power to two current buses 16, 22 having different loads. The inventive method and circuit therefore eliminate the need for a separate, additional battery to provide power to the second current bus 22.

We claim:

1. A method for balancing energy levels between a first battery group and a second battery group in a battery pack, said first and second battery groups connected across a first current bus and said first battery group further connected across a second current bus, said method comprising the steps of:

generating a first state of charge value indicative of a first energy level of said first battery group;

generating a second state of charge value indicative of a second energy level of said second battery group; and, controlling said first energy level responsive to said first state of charge value and said second state of charge value so as to balance the first and second energy levels.

2. The method of claim 1 wherein said step of generating a first state of charge value includes the substeps of:

sensing a first current level of a first current in said first battery group; and, determining said first state of charge value responsive to said first current level.

3. The method of claim 1 wherein said step of generating a second state of charge value includes the substeps of:

sensing a first current level of a first current in said second battery group; and, determining said second state of charge value responsive to said first current level.

4. The method of claim 3 wherein said sensing substep includes the substeps of:

measuring a second current level of a second current in said first battery group;

measuring a third current level of a third current provided by said first battery group to said second current bus; and, subtracting said third current level from said second current level.

5. A method for balancing energy levels between a first battery group and a second battery group in a battery pack, said first and second battery groups connected across a first current bus and said first battery group further connected across a second current bus, said method comprising the steps of:

generating a first state of charge value indicative of a first energy level of said first battery group;

generating a second state of charge value indicative of a second energy level of said second battery group; and, controlling said first energy level responsive to said first state of charge value and said second state of charge value, wherein said controlling step includes the substep of charging said first battery group to thereby balance said first energy level of said first battery group with said second energy level of said second battery group, said substep of charging said first battery group includes the substeps of:

generating a reference current value responsive to said first and second state of charge values;

comparing said reference current value to a first current level of a first current provided by said first battery group to said second current bus to thereby obtain a current error value;

providing a second current to said first battery group responsive to said current error value; and, wherein said substep of providing a second current includes the substep of controlling a converter responsive to said current error value.

6. The method of claim 5 wherein said substep of generating a reference current value includes the substeps of:

comparing said first and second state of charge values to obtain a state of charge difference value; and, accessing a memory using said state of charge difference value obtain said reference current value.

7. The method of claim 5 wherein said substep of controlling a converter includes the substep of controlling an operating voltage of said converter within predetermined upper and lower voltage limits.

8. The method of claim 7 wherein said substep of controlling an operating voltage of said converter includes the substep of determining said upper and lower voltage limits responsive to a temperature associated with said first battery group.

9. A circuit for balancing energy levels between a first battery group and a second battery group in a battery pack, said first and second battery groups connected across a first current bus and said first battery group further connected across a second current bus, said circuit comprising:

means for generating a first state of charge value indicative of a first energy level of said first battery group;

means for generating a second state of charge value indicative of a second energy level of said second battery group; and, means for controlling said first energy level responsive to said first and second state of charge values so as to balance the first and second energy levels.

10. The circuit of claim 9 wherein said means for generating a first state of charge value includes:

means for sensing a first current level of a first current in said first battery group; and, means for determining said first state of charge value responsive to said first current level.

11. The circuit of claim 9 wherein said means for generating a second state of charge value includes:

means for sensing a first current level of a first current in said second battery group; and, means for determining said second state of charge value responsive to said first current level.

12. The circuit of claim 11 wherein said sensing means includes:

means for sensing a second current level of a second current in said first battery group;

means for sensing a third current level of a third current provided by said first battery group to said second current bus; and, means for comparing said third current level to said second current level.

13. A circuit for balancing energy levels between a first battery group and a second battery group in a battery pack, said first and second battery groups connected across a first current bus and said first battery group further connected across a second current bus, said circuit comprising:

means for generating a first state of charge value indicative of a first energy level of said first battery group;

means for generating a second state of charge value indicative of a second energy level of said second battery group; and, means for controlling said first energy level responsive to said first and second state of charge values, wherein said controlling means includes means for charging said first battery group to thereby balance said first energy level of said first battery group with said second energy level of said second battery group wherein said charging means includes:

means for generating a reference current value responsive to said first and second state of charge values;

means for comparing said reference current value to a first current level of a first current provided by said first battery group to said second current bus to thereby obtain a current error value; and, means for providing a second current to said first battery group responsive to said current error value.

14. The circuit of claim 13 wherein said means for generating a reference current value includes:

means for comparing said first and second state of charge values to obtain a state of charge difference value; and, means for accessing a memory using said state of charge difference value to obtain said reference current value.

15. The circuit of claim 13 wherein said means for providing a second current includes means for controlling a converter responsive to said current error value.

16. The circuit of claim 15 wherein said means for controlling a converter includes means for controlling an operating voltage of said converter within predetermined upper and lower voltage limits.

17. The circuit of claim 16 wherein said means for controlling an operating voltage includes means for determining said upper and lower voltage limits responsive to a temperature associated with said first battery group.

* * * * *